United States Patent [19]

Carnine et al.

[11] 4,096,039
[45] Jun. 20, 1978

[54] CONDITION SENSING CONTROL SYSTEM FOR DESALINATOR AUTOMATION

[75] Inventors: Howard H. Carnine, Costa Mesa; Carter R. Robinson, Newport Beach, both of Calif.

[73] Assignee: Carnine Corporation, Newport Beach, Calif.

[21] Appl. No.: 642,039

[22] Filed: Dec. 18, 1975

[51] Int. Cl.² .............................................. B01D 3/42
[52] U.S. Cl. ........................................ 202/205; 202/206;
    202/160; 203/2; 203/3; 203/11; 203/DIG. 7; 203/DIG. 8
[58] Field of Search ............... 203/2, 3, DIG. 18, 11, 203/DIG. 8, DIG. 7; 202/206, 160, 202, 205; 196/132, 141

[56] References Cited

U.S. PATENT DOCUMENTS

| | | | |
|---|---|---|---|
| 2,441,361 | 5/1948 | Kirgan | 202/206 |
| 2,589,406 | 3/1952 | Latham | 202/206 |
| 3,212,997 | 10/1965 | Walker | 203/2 |
| 3,238,111 | 3/1966 | Harper | 203/3 |
| 3,347,755 | 10/1967 | Brooks | 202/206 |
| 3,483,092 | 12/1969 | Young | 203/2 |
| 3,493,468 | 2/1970 | Arcari | 202/206 |
| 3,527,676 | 9/1970 | Hingst et al. | 203/3 |
| 3,533,917 | 10/1970 | Williams | 203/2 |
| 3,577,320 | 5/1971 | Randell | 203/2 |
| 3,864,215 | 2/1975 | Arnold | 203/11 |

*Primary Examiner*—Wilbur L. Bascomb, Jr.
*Attorney, Agent, or Firm*—Knobbe, Martens, Olson, Hubbard & Bear

[57] ABSTRACT

An electronic system for automatically controlling the operation of a desalination system, and particularly such systems utilizing waste heat from internal combustion engines. The automatic control system is responsive to physical parameters within the desalinator and is particularly useful during warm-up and cooling periods at the beginning and end of use of such a desalination system for minimizing wear on system components and for maximizing the operational life of the system.

4 Claims, 2 Drawing Figures

CONDITION SENSING CONTROL SYSTEM FOR DESALINATOR AUTOMATION

BACKGROUND OF THE INVENTION

The present invention relates to desalination devices such as those which operate on waste heat from internal combustion engines or other sources and, more particularly, to a control system for operating the various elements in a desalination mechanism in accordance with conditions within such a system sensed by the electronic control.

Prior art desalination systems designed to treat nonpotable water, typically sea water, to produce potable water for drinking and other uses have in some instances utilized waste heat from relatively low temperature sources such as the cooling jackets of internal combustion engines. In such an installation the heat source, that is, the engine cooling fluid, is usually below the atmospheric pressure boiling point of sea water or other nonpotable water. Such systems therefore utilize a boiler chamber which is evacuated to a sufficient degree to lower the boiling temperature of the nonpotable water to permit boiling by heat sources in the 120° to 190° F. temperature range. Such systems generally utilize pumped, raw, nonpotable water which is available at temperatures below 100° to cool condensing tubes within the boiler and positioned above a collector. These systems require a fairly sophisticated and delicate balance between the various elements for proper, efficient operation. Thus the amount of heat supplied by the thermal source, the amount of sea water supplied to the condenser, the amount of sea water supplied to the boiler system as well as the amount of fresh water drawn from the collector and the vacuum level within the boiler must all be fairly accurately controlled to maintain balanced system operation.

Particular difficulties with systems of this type are generated at the beginning and end of an evaporating cycle, which difficulties have not been adequately surmounted by prior art systems.

In particular, if the heat source is allowed to operate during times when the boiler vessel is not properly evacuated, for example, hot salt water can scale the surface of the heating elements, resulting in an ultimate reduction of efficiency for the entire desalination system. Similar difficulties occur throughout the system if adequate means are not incorporated for programming the application and removal of various elements during initial system warm-up and ultimate system shutdown. In general, the prior art has attempted to maintain system balance during these periods through a plurality of manually operated controls used in conjunction with a detailed operational procedure in which the system operator activates certain valves after certain time periods have elapsed, the time periods being selected to assure the prevention of damage to system components. Similarly, other prior art systems have utilized time delay circuits for actuating certain system valves at predetermined times so that, even under the most severe conditions, that is, under conditions where the fluid supplying heat to the system is at a relatively high temperature or the raw, nonpotable water is at an extremely high temperature, the system will nevertheless sequence in a manner which will prohibit damage to system components. Each of these systems, in order to prevent system damage, must be designed to accommodate a great variety of temperatures and flow rates depending upon parameters such as the internal combustion engine temperature and sea water temperature which are outside of the system control. As a consequence, when the conditions are not as adverse as might occur in the worst case, system efficiency is greatly reduced by the operation of system components placed in readiness prior to actual vaporization of raw water or collection of fresh water from the system.

These and other disadvantages of the prior art are overcome in the present system through the utilization of plural temperature and vacuum sensors operating in conjunction with a sequencing control system used during warm-up and shutdown of a desalination system. In general, the desalination system includes a boiler containing nonpotable water and a heat exchanger for supplying heat from the cooling fluid of an internal combustion engine to the nonpotable water in the boiler. The flow of fluid from the internal combustion engine cooling jackets is controlled, as by a pump which selectively supplies the fluid to the boiler of the present apparatus or to the normal cooling radiator used for the internal combustion engine. Nonpotable raw water is drawn, typically through a filter, by a second pump and is forced first through a condensing tube located within the boiler to cool the condensing tube to provide fresh water from the evaporated nonpotable water. The raw water is then pumped through a venturi nozzle which is used to provide a vacuum within the boiler of the system to reduce the vaporization temperature of the raw water below that provided by the cooling fluid from the internal combustion engine. A collecting chamber is provided within the boiler below the condensing tubes and fresh water is drawn from this collecting chamber by a third pump which is sufficient to overcome the vacuum within the boiler chamber. This third pump may additionally be used to provide the pressure for a fresh water pressure storage tank. Water may be supplied to the boiler chamber by a connecting line to the condensing tube, this water having been previously warmed in the condensing process and serving as a warm water source for the boiler.

The control system of the present invention, during warmup of the system, includes a manually activated switch for initially activating the raw water pump to pass raw water through the venturi nozzle, thereby reducing the pressure within the boiler chamber and supplying raw water to the boiler chamber. A vacuum sensor is located within the boiler chamber and automatically activates the pump or other control element for applying heated fluid from the thermal source, such as an internal combustion engine, to the water previously admitted to the boiler chamber.

A temperature sensor located in the boiler chamber and responsive to the raw water within that chamber is utilized to control the fresh water pump, drawing water from the condenser collection chamber after the boiler raw water has been raised to a temperature sufficient to begin the evaporation process. In response to this same temperature sensor, a salinity monitoring cell is activated to selectively conduct fluid pumped from the condenser collecting chamber by the fresh water pump to either a storage vessel, if the salinity is below a predetermined level, or back to the boiler chamber, if the salinity does not meet specifications required for drinking water.

When the system is deactivated, the same switch initially utilized for starting the warm-up procedure and starting the raw water pump is opened to automatically deactivate the fresh water pump and the flow control element used to control the heating water fluid from the internal combustion engine. The switch, however, is bypassed so that the raw water pump continues to pump cooling water through the condensing tubes and continues to generate a vacuum within the boiler until a second temperature probe within the boiler indicates that the temperature of the fluid within the boiler are below the evaporation temperature. This temperature probe then automatically controls a bypassing switch so that the raw water pump is deactivated and the system is allowed to reach atmospheric pressure. This sequence therefore assures that the heating tubes within the boiler are not scaled by the application of heated fluids thereto when the system is not in a condition for evaporation, both during warm-up and shutdown of the system.

These and other advantages of the present invention are best understood through a reference to the drawings, in which:

FIG. 1 is a schematic illustration of the desalination system of the present invention; and FIG. 2 is a schematic diagram of the electronic control system used to control the desalination system shown in FIG. 1.

DETAILED DESCRIPTION OF THE PREFERRED EMBODIMENT

Figures 1, 2:
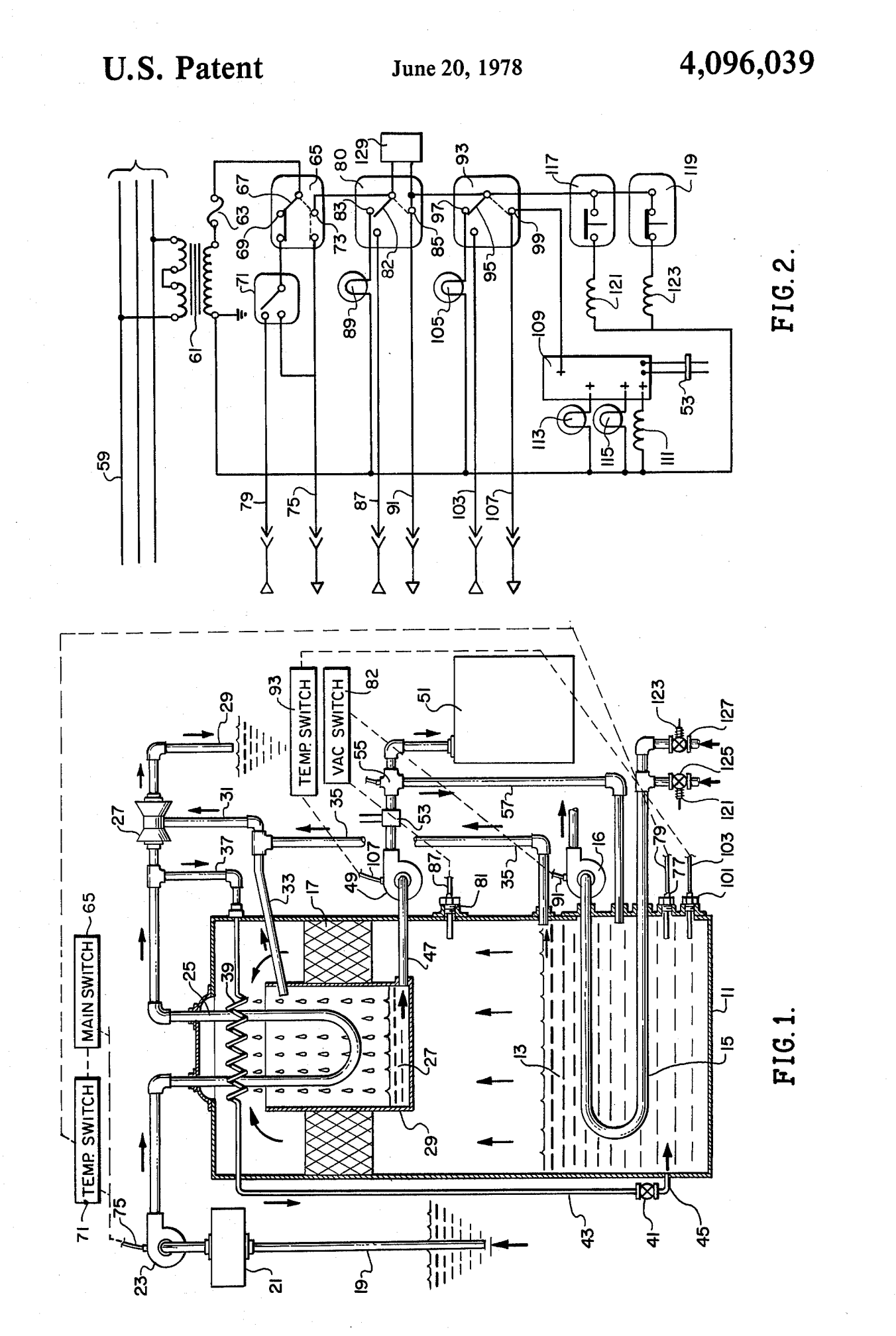

Referring initially to FIG. 1, the desalination apparatus of the present invention includes a boiler 11 designed to operate at pressures below standard atmospheric pressure. The lower portion of this boiler 11 is designed to serve as an evaporation vessel for raw water 13 which may, for example, be sea water. Through this raw water vessel portion of the boiler 11 a heating tube 15 circulates a heat transfer fluid to supply, for example, heat from the cooling jacket of an internal combustion engine. The boiler 11 as well as the remaining apparatus shown in FIG. 1 is designed to be relatively lightweight for application, for example, on a boat or other location such as an oil drilling platform at which large volumes of nonpotable water, typically sea water, are available but at which fresh water is not available.

The heat transfer fluid supplied to the heating tube 15 may conveniently be circulated by a pump 16 which serves to draw cooling fluid from an internal combustion engine in a well known manner. This fluid is typically drawn from the normal radiator inlet of the internal combustion engine cooling system after being heated by passage through the cooling jackets within the internal combustion engine and is returned by the pump 16 to the radiator inlet for subsequent circulation through the engine radiator and internal combustion engine. It will be understood by those familiar with this art that the temperature of this heating fluid is typically between 160° and 200° F.

Located within the boiler 11 and above the level of the raw water 13 is a demister 17 which acts as a separator for removing any moisture particles which may be entrained in the steam produced by boiling the raw water 13. The separator 17 typically includes a matrix baffle structure which permits free flow of steam, the steam typically flowing past plural surfaces within the separator 17 to release entrained water droplets which then fall back into the raw water bath 13.

Raw water such as sea water is drawn through a pipe 19 and filter element 21 by a raw water pump 23 and passes under pressure through a condenser tube 25 located within the upper end of the boiler 11. The condenser tube 25 may typically include plural finned tubes permitting the raw water to absorb heat from the steam within the boiler which has passed through the separator 17 to condense the water vapor and produce distilled water 27 which falls into a fresh water collection vessel 29 surrounding a portion of the condenser tube 25. The major portion of the raw water flowing from the condenser tube 25 is passed under pressure through a venturi nozzle 27 and dumped by a tube 29 back to the raw water source.

The venturi nozzle 27 serves as a vacuum source for the boiler 11, evacuating a tube 31 connected to the throat of the venturi 27. The tube 31 is connected to a tube 33 evacuating the fresh water vessel 29 and the entire boiler 11. In addition, the tube 31 is connected to a scavenging tube 35 which is connected to the boiler at a level at which the raw water 13 is to be maintained. This scavenging tube 35 draws high salt concentrations from the surface of the raw water 13 while assuring that the level of the raw water 13 does not increase above the level of the scavenging tube 35.

A small portion of the water exiting the condenser 25 is passed through a tube 37 and heat exchanger 39 through the condenser portion of the boiler 11 to further aid in condensing the steam within the boiler 11 and to simultaneously further heat this small amount of water. This raw heated water passes through a valve 41, connected by a tube 43 to the heat exchanger 39, to a raw water inlet 45 supplying the raw water 13 to the boiler 11. The valve 41 may be used as a throttling orifice to maintain a predetermined desired flow rate of water within the raw water bath 13 to permit scavenging by the scavenging tube 35 while at the same time not permitting a substantial flow of raw water through the bath 13 which would reduce the efficiency of the evaporated system. It will be understood, of course, that raw water scavenged by the tube 35 is drawn through the venturi nozzle 27 and dumped back to the raw water source.

Fresh water is pumped from the fresh water vessel 29 through a tube 47 connected to a fresh water pump 49 which is sufficient to overcome the vacuum within the boiler 11. In addition, the fresh water pump 49 may be sufficient to provide water under pressure in a fresh water storage container 51. Water exiting the pump 49 passes first through a salinity monitoring cell 53 which, as will be explained in more detail below, operates a two-way valve 55. If the salinity monitored by the salinity cell 53 is below an acceptable level, the two-way valve 55 conducts water from the fresh water pump 49 into the fresh water storage vessel 51. If the salinity rises above an acceptable level, the two-way valve 55 is energized by the cell 53 to pass water from the pump 49 to a conduit 57 connected to return such high salinity water to the raw water bath 13. This return increases the efficiency of the evaporator system since the salinity of the water has been previously substantially reduced and since the water is warm when it is removed from the fresh water vessel 29.

Referring now to FIGS. 1 and 2 in combination, the use of the control system of the present invention for operating the desalination system of FIG. 1 will be described. Input electrical power is supplied by plural electrical lines 59 and a transformer 61 to supply power through a fuse 63 to the electronic system. One terminal of the transformer 61 is grounded as is one terminal of each of the pumps 16, 23 and 49 of the evaporator system. The remaining terminal of the transformer 61 is connected through a fuse 63 to a double pole, double throw switch 65 which serves as the power switch for the desalination system. When this switch is in the OFF position, as shown in solid lines a switch wiper 67 is connected to a first switch terminal 69 which is in turn connected in series through a single pole single throw temperature activated switch 71. Both the second pole 73 of the switch 65 and the remaining terminal of the switch 71 are connected to an output conductor 75 used to energize the raw water pump 23 of FIG. 1. The temperature controlled switch 71 is controlled by a temperature sensor 77 connected to the raw water bath 13 of the boiler 11. The temperature sensor 77 may be connected to the switch 71 by hydraulic or electrical conductors 79 in a conventional manner or, alternatively, the switch 71 may be mounted directly in the temperature probe 77. The switch 71 and temperature probe 77 cooperate to close the switch 71 whenever the temperature of the raw water 13 within the boiler 11 exceeds 100° F. At lower temperature the switch 71 is normally open so that only conductive path for energizing the raw water pump 23 through the conductor 75 is through the second pole 73 of the switch 65, with the wiper 67 in the ON position as shown in phantom lines.

A single pole, double throw switch 80 includes a wiper 82 connected to the pole 73 of the switch 65 so that the switch 80 is energized by positioning the switch 65 in the ON position. The switch 80 operates in response to a vacuum sensor 81 mounted within the boiler 11 above the level of the raw water bath 13. In a typical embodiment, the wiper 82 is normally in contact with a first switch contact 83, as shown by solid lines, whenever the sensor 81 senses a vacuum which is less than 28 inches of mercury. When the vacuum within the vessel 11 exceeds 28 inches of mercury, the sensor 81 energizes the switch 80 to move the wiper 82 into contact with a second switch contact 85, as shown in phantom lines. As with the temperature activated switch 65, the vacuum actuated switch 80 may be remotely actuated from the sensor 81 by hydraulic or electrical connections 87 or may be physically placed within the vacuum probe 81. When the wiper 82 is in the solid line position in contact with terminal 83 and the switch 80 is activated by placing the switch 65 in the ON position, a light 89 which is connected in series with the terminal 83 is illuminated to indicate that the vacuum within the vessel 11 has not yet reached the optimum level for vaporization of the raw water 13. Once the desired vacuum level has been reached, the sensor 87 activates the switch 80 so that the wiper 82 contacts the terminal 85, energizing through a conductor 91 the heat transfer fluid pump 16. At the same time, the light 89 is extinguished indicating that the proper vacuum level has been reached. It will be appreciated that, upon activation of the heat transfer fluid pump 16 and raw water pump 23, the evaporation process will commence.

A third single pole, double throw switch 93 includes a switch wiper 95 which is connected to the terminal 85 of the switch 80 for activation when the proper vacuum level is reached. The switch wiper 95 is normally connected to a first terminal 97, as shown in solid lines, but is activated to the phantom position for contact with a second switch terminal 99 by a second temperature probe 101. This temperature probe 101, as with the first temperature probe 77 and vacuum probe 81, is connected by electrical or hydraulic connection 103 to the switch 93 or, alternately, the switch 93 may be physically embodied within the temperature probe 101. The temperature probe 101 activates the switch 93 to the phantom position when the temperature of the raw water bath 13 reaches 135° F., that is, a temperature which is sufficient to boil the raw water 13 at a vacuum of 28 inches of mercury. Up until the time that the switch 93 is so activated, an indicator lamp 105 on a switch panel indicates to the operator that the water bath 13 is still below the boiling temperature. Thus, when the water bath reaches 135° F., the wiper 95 is moved into contact with the terminal 99, extinguishing the pilot lamp 105 and activating, through a conductor 107, the fresh water pump 49 to draw fresh water from the vessel 29.

Simultaneously with the closure of the switch 93 to the phantom position, the salinity monitoring cell 53, shown in both FIGS. 1 and 2, is energized by a control circuit 109 which is well known in the art. This control circuit 109 activates a solenoid 111 which controls the two-way fluid valve 55 of FIG. 1 to selectively conduct the output flow of water from the fresh water pump 49 to the fresh water storage vessel 51 or the raw water bath 13 through the conduit 57. A pair of pilot lights 113 and 115 mounted on the front panel of the electronic apparatus notify the operator as to the condition of the solenoid 111, that is, whether the output water being produced by the boiler 11 is above or below the predetermined salinity level.

Actuation of the switch 80 to the phantom position in contact with the terminal 85 additionally activates a pair of single pole, single throw switches 117 and 119, each connected in series with a solenoid 121 or 123 used to operate a pair of solenoid valves 125 and 127, respectively, shown on FIG. 1. The solenoid valves 125 and 127 may each be connected in series with a source of heated fluid such as, for example, separate internal combustion engines on a vessel. The switches 117 and 119 may therefore be used to select one or the other or both of these internal combustion engines as a heat source for the boiler 11. Thus, when the switch 80 closes in response to an increase in the vacuum within the vessel 11 sensed by the vacuum probe 81, heat will automatically flow from the heat source or sources previously selected by closure of one or both of the switches 117, 119.

A time delay circuit 129 may be connected in parallel with the switch 80 to delay the interruption of current through the switch 80 after the vacuum probe 81 has sensed a subsidence of the vacuum within the chamber. Thus, once the switch wiper 82 has been moved from the terminal 85 to the terminal 83 upon sensing a vacuum reduction within the vessel 11, the time delay 129 will delay the deactivation of the heating fluid pump 16, the fresh water pump 49, as well as the salinity monitoring system. This delay may be, for example, 180 seconds, to assure that the vacuum decrease is not simply a momentary aberration within the system, but rather a true indication that the system is malfunctioning or being deenergized, in which instance the heat source and fresh water pump should be deactivated.

The operation of the system previously described is as follows. Prior to manual activation of the main power switch 65 to the phantom line position, the system is deactivated, with atmospheric pressure within the boiler 11, no flow of heating fluid through the heat supply tube 15 and no flow of raw water through the inlet pipe 19. There is likewise no pumping of fluid from the fresh water vessel 29 by the pump 49. When the switch 65 is activated to the phantom position, the raw water pump 23 is activated through the line 75 to draw raw water from the source by the pipe 19, to circulate this water through the condenser tube 25, to supply water to the raw water bath 13 through the line 43 and to activate the venturi nozzle 27 to draw a vacuum within the vessel 11 and to scavenge water from the surface from the raw water bath 13. Activation of the switch 65 to the phantom line position additionally energizes the switch 80 which is initially in the solid line position so that the pilot light 89 is lit to indicate that the vacuum within the system has not yet reached a level which will permit the raw water 13 to vaporize at the reduced temperature available from the heat source. As soon as this vacuum is reached, as sensed by the vacuum sensor 81, the switch 80 is activated to the phantom position, extinguishing the pilot light 89 and energizing, through the line 91, the heat source fluid pump 16. Simultaneously the switches 117 and 119 are activated so that the appropriate heat source previously selected by closure of one, the other or both of these switches 117, 119 will be available through one of the solenoid valves 125, 127 for supplying heated fluid to the pipe 15. Closure of the switch 80 to the phantom position additionally energizes the switch 93 which is in the solid line position, activating a pilot lamp 105 to indicate that the raw water bath 13 has not yet reached a temperature which will cause boiling of the bath 13. When this temperature is reached, as is sensed by the temperature probe 101, the switch 93 is activated to the phantom position energizing both the fresh water removal pump 49 and the salinity monitoring system 109. The salinity monitoring system 109 in turn activates the solenoid valve 55 in accordance with measurements made by the salinity cell 53 and activates pilot lamps 113 or 115 alternately to indicate whether low salinity or high salinity water is being produced by the system. It can be seen therefore that the system operates to permit heat to be supplied through the pipe 15 only after the remainder of the system has reached the vacuum level which will permit boiling of the water by heat conducted from the tube 15. Similarly, the pump 49 is activated only after the water bath 13 has reached boiling temperature so that unnecessary power is not drawn by the pump 49 when the fresh water vessel 29 is empty.

When the system is to be deactivated, the switch 65 is manually moved to the solid line position shown in FIG. 2, deactivating the fresh water pump 49, the heating fluid pump 16, and the salinity monitoring cell 109 as well as the solenoid valves 125 and 127 to isolate the system from heat sources. The fresh water vessel 29 has sufficient capacity to store water which may be condensed during a short period after the switch 65 is placed in the OFF position. It will be noted, however, that in the OFF position the switch 65 permits continued operation of the fresh water pump 23 energized through the line 75 by the temperature activated switch 71. Raw water will continue to be passed through the condenser tube 25 and a vacuum will be continuously drawn by the venturi 27 until the temperature probe 77 monitors a temperature which is below the boiling point of the raw water bath 13. When this occurs, the switch 71 will automatically open to discontinue operation of the pump 23. It can thus be seen that a vacuum is maintained within the boiler 11 and the condensing tube is cooled until the temperature of the bath 13 within the boiler 11 is reduced below the boiling point at the evacuated pressure level. At this point, the switch 71 opens to discontinue operation of the pump 23 so that pressure within the vessel immediately rises to atmospheric pressure, the boiling point of the bath 13 now being substantially above the temperature within the bath so that no scaling of the pipe 15 can occur due to temperatures within the bath 13 which are slightly below the boiling temperature at the existent pressure.

After the automatic opening of the switch 71, the system is entirely deactivated.

During operation of the system, if the vacuum within the boiler 11 should be reduced below 28 inches of mercury for any reason, the switch 80 will be automatically moved to the solid line position by the vacuum sensing probe 81, automatically deactivating the solenoid valves 125 and 127, the salinity monitoring cell 109 and the fresh water pump 107 as well as the heat source pump 16. This will only occur, however, after the time delay circuit 129 has measured a predetermined elapsed time period, for example 180 seconds. Thus, if the vacuum reduction sensed by the probe 81 is due to a momentary fluctuation as may occur for example when the raw water bath 13 first begins to boil but before condensing begins around the condensing tube 25, the time delay 129 will maintain conductivity in a parallel path around the switch 80 to avoid unnecessary deactivation of the remaining system components.

What is claimed is:

1. A control system for operating a low pressure evaporative desalinator having a mechanism for introducing heat to a boiler chamber at temperatures below the atmospheric pressure boiling point of the raw water, a mechanism for drawing a vacuum within said boiler chamber, and a mechanism for pumping fresh water from said chamber, comprising:
   a main control switch having an ON position for activating and an OFF position for deactivating said desalinator;
   means for sensing the temperature of the raw water within said boiler chamber;
   means for sensing the vacuum within said boiler chamber;
   means responsively connected to said temperature sensing means and said switch for activating said vacuum drawing mechanism whenever said switch is in said ON position or said temperature sensing means monitors a temperature above a first predetermined level;
   means responsively connected to said switch and said vacuum sensing means for activating said heat introducing mechanism when said switch is in said ON position and said vacuum sensing means simultaneously monitors a pressure below a predetermined level which level is below atmospheric pressure; and
   means responsively connected to said switching means, said vacuum sensing means and said temperature sensing means for activating said fresh water pumping mechanism when said switch is in said ON position, when said temperature is simultaneously above a second predetermined level and when said pressure is simultaneously below said predetermined level.

2. A control system for operating a low pressure evaporative desalinator as defined in claim 1 wherein said desalinator includes a condenser for cooling vapors produced by boiling said raw water to produce fresh water, said means for activating said vacuum drawing mechanism additionally activating said condenser whenever said switch is in said ON position or said temperature sensing means monitors a temperature above said predetermined level.

3. A control system for operating a low pressure evaporative desalinator as defined in claim 1 wherein said desalinator includes a salinity monitoring device for controlling the flow of said fresh water pumped from said chamber and wherein said means for activating said fresh water pump additionally activates said salinity monitoring device when said switching means is closed, when said temperature is simultaneously above said second predetermined level and when said vacuum is simultaneously above said predetermined level.

4. A control system for operating a low pressure evaporative desalinator as defined in claim 1 additionally comprising:

time delay means connected to said means for activating said heat introducing mechanism, said time delay means permitting continued actuation of said heat introducing mechanism, once actuated, when said vacuum sensing means monitors a vacuum below said predetermined level for less than a predetermined time period.

* * * * *